(12) United States Patent
Tame

(10) Patent No.: US 7,165,813 B2
(45) Date of Patent: Jan. 23, 2007

(54) RECLINER ASSEMBLY FOR AN AUTOMOTIVE VEHICLE SEAT HAVING A FLOATING CAM

(75) Inventor: Omar D. Tame, West Bloomfield, MI (US)

(73) Assignee: Intier Automotive Inc., Newmarket (CA)

( * ) Notice: Subject to any disclaimer, the term of this patent is extended or adjusted under 35 U.S.C. 154(b) by 0 days.

(21) Appl. No.: 10/541,106

(22) PCT Filed: Jan. 26, 2004

(86) PCT No.: PCT/US2004/002244

§ 371 (c)(1),
(2), (4) Date: Jun. 30, 2005

(87) PCT Pub. No.: WO2004/067313

PCT Pub. Date: Aug. 12, 2004

(65) Prior Publication Data

US 2006/0071526 A1   Apr. 6, 2006

(51) Int. Cl.
B60N 2/235 (2006.01)

(52) U.S. Cl. ...................................... 297/367

(58) Field of Classification Search ............... 297/367
See application file for complete search history.

(56) References Cited

U.S. PATENT DOCUMENTS

| 4,348,050 | A | * | 9/1982 | Letournoux et al. ..... 297/367 X |
| 4,770,464 | A | * | 9/1988 | Pipon et al. ................ 297/367 |
| 5,622,407 | A | | 4/1997 | Yamada et al. |
| 5,681,086 | A | * | 10/1997 | Baloche ...................... 297/367 |
| 5,727,846 | A | | 3/1998 | Yoshida |
| 6,007,152 | A | * | 12/1999 | Kojima et al. .............. 297/367 |
| 6,007,153 | A | * | 12/1999 | Benoit et al. .......... 297/367 X |
| 6,023,994 | A | | 2/2000 | Yoshida |
| 6,024,410 | A | | 2/2000 | Yoshida |
| 6,085,386 | A | | 7/2000 | Blanchard et al. |
| 6,092,874 | A | | 7/2000 | Kojima et al. |
| 6,095,608 | A | | 8/2000 | Ganot et al. |
| 6,112,370 | A | | 9/2000 | Blanchard et al. |
| 6,142,569 | A | | 11/2000 | Kidokoro et al. |
| 6,164,723 | A | * | 12/2000 | Ganot ................... 297/367 X |
| 6,312,053 | B1 | | 11/2001 | Magyar |
| 6,318,805 | B1 | * | 11/2001 | Asano ........................ 297/367 |
| 6,325,458 | B1 | * | 12/2001 | Rohee et al. .............. 297/367 |

(Continued)

FOREIGN PATENT DOCUMENTS

EP   1 195 115 A1   4/2002

Primary Examiner—Rodney B. White
(74) Attorney, Agent, or Firm—Clark Hill PLC

(57) ABSTRACT

A recliner assembly is disclosed for providing selective pivotal adjustment of a seat back relative to a seat cushion. The recliner assembly includes a fixed plate fixedly secured to the seat cushion and a mobile plate fixedly secured to the seat back. The mobile plate is fixedly secured to the fixed plate. The mobile plate includes an annular rim having a plurality of teeth. A pawl is slidably supported between the fixed and mobile plates for movement in and out of locking engagement with the plurality of teeth. A cam is fixedly secured to a shaft rotatably journaled through an aperture formed in the mobile plate. The aperture is oversized relative to the shaft to allow the shaft and the cam to float radially relative to the pawl to help prevent binding of the pawl during movement in and out of locking engagement with the plurality of teeth.

25 Claims, 4 Drawing Sheets

U.S. PATENT DOCUMENTS

| | | | |
|---|---|---|---|
| 6,328,383 B2* | 12/2001 | Rohee et al. | 297/367 |
| 6,364,413 B1 | 4/2002 | Rohee et al. | |
| 6,390,557 B1* | 5/2002 | Asano | 297/367 |
| 6,402,249 B1 | 6/2002 | Rohee et al. | |
| 6,561,585 B2* | 5/2003 | Cilliere et al. | 297/367 |
| 6,609,756 B2* | 8/2003 | Kojima et al. | 297/367 |
| 6,648,414 B2* | 11/2003 | Ikegaya et al. | 297/367 |
| 6,669,296 B2* | 12/2003 | Moriyama et al. | 297/367 |
| 6,676,217 B2* | 1/2004 | Lange | 297/367 |
| 6,726,281 B2* | 4/2004 | Baloche | 297/367 |
| 6,733,077 B2* | 5/2004 | Asano | 297/367 |
| 6,742,844 B2* | 6/2004 | Pollack | 297/367 |
| 6,749,263 B2* | 6/2004 | Peters | 297/367 |
| 6,910,737 B2* | 6/2005 | Hosokawa | 297/367 X |
| 6,991,295 B2* | 1/2006 | Peters | 297/367 |
| 2001/0001220 A1 | 5/2001 | Robee et al. | |
| 2002/0043855 A1 | 4/2002 | Lange | |
| 2002/0043856 A1* | 4/2002 | Ikegaya | 297/367 |
| 2002/0053825 A1* | 5/2002 | Reubeuze et al. | 297/367 |
| 2002/0096924 A1* | 7/2002 | Reubeuze | 297/367 |
| 2002/0171280 A1 | 11/2002 | Okazaki et al. | |
| 2002/0175548 A1 | 11/2002 | Asano et al. | |
| 2003/0085603 A1 | 5/2003 | Lee et al. | |
| 2003/0178879 A1* | 9/2003 | Uramichi | 297/367 |
| 2004/0066078 A1* | 4/2004 | Matsuura et al. | 297/367 |

\* cited by examiner

RECLINER ASSEMBLY FOR AN AUTOMOTIVE VEHICLE SEAT HAVING A FLOATING CAM

BACKGROUND OF THE INVENTION

1. Field of the Invention

The invention relates to a recliner assembly for an automotive vehicle seat. More particularly, the invention relates to a recliner assembly having a cam that prevents binding.

2. Description of the Related Art

Automotive vehicles include seat assemblies for supporting occupants within the vehicle. Seat assemblies include a seat cushion and a seat back. Seat assemblies typically include a recliner assembly interconnecting the seat cushion and the seat back. The recliner assembly allows the seat back to be pivotally adjusted relative to the seat cushion between a plurality of reclined positions with the recliner locking the seat back in each of those plurality of reclined positions.

Disc-type recliner assemblies are commonly known to those skilled in the art. Such recliner assemblies include a fixed plate that is fixedly secured to the seat cushion and a mobile plate that is fixedly secured to the seat back. The mobile plate is rotatably coupled to the fixed plate to allow pivotal adjustment of the seat back relative to the seat cushion. At least one pawl is slidably supported between the fixed and mobile plates for movement in and out of locking engagement with an annular rim of teeth formed in the mobile plate. With the pawl lockingly engaged with the annular rim of teeth, the seat back is held in one of the plurality of reclined position. With the pawl disengaged from the annular rim of teeth, the seat back freely pivots relative to the seat cushion.

A cam is mounted a shaft extending through an aperture in one or both of the plates for controlling movement of the pawls between locked and unlocked conditions. In some conventional recliner assemblies, generally parallel guide surfaces are used to guide the pawls between the locked and unlocked conditions. However, in recliner assemblies having parallel guide surfaces, it is common for the pawls to bind against the guide surfaces during movement between the locked and unlocked conditions. It is also possible for the teeth of the pawls to not fully engage the teeth of the mobile flange.

SUMMARY OF THE INVENTION

According to one aspect of the invention, a recliner assembly is provided for use with a seat having a seat cushion and a seat back pivotal between a plurality of reclined positions with respect to the seat cushion. The recliner assembly includes a fixed plate fixedly secured to the seat cushion. A mobile plate is fixedly secured to the seat back. The mobile plate is pivotally coupled to the fixed plate for pivotal movement of the seat back through the plurality of reclined positions. The mobile plate includes an annular rim defining an axis and a plurality of teeth extending along the annular rim. A sector having a rack of teeth is coupled between the fixed and mobile plates. The sector is movable between a locked condition having the rack of teeth engaged with the plurality of teeth to maintain the seat back in any one of the plurality of reclined positions and an unlocked condition having the rack of teeth disengaged from the plurality of teeth to allow selective adjustment of the seat back relative to the seat cushion between the plurality of reclined positions. A cam extends around the axis and is selectively engagable with the sector and rotatably supported between the fixed and mobile plates for moving the sector between the locked and unlocked conditions in response to the rotation of the cam. The cam is radially movable relative to the sector to prevent binding of the sector during movement between the locked and unlocked conditions.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
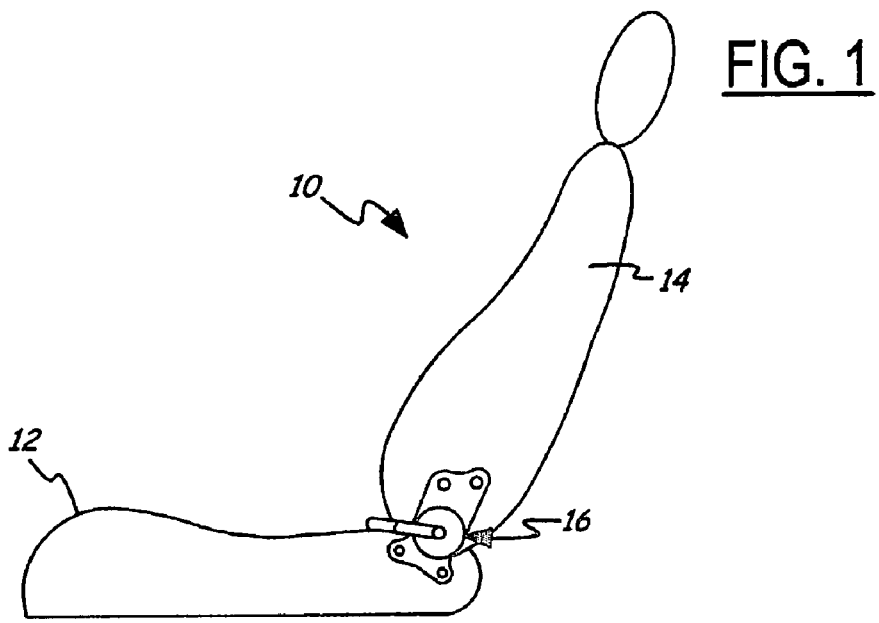
FIG. 1 is a side view of a seat assembly incorporating a recliner assembly according to one aspect of the invention.

Referring to the Figures, a seat assembly is generally indicated at 10 in FIG. 1. The seat assembly 10 includes a seat cushion 12 and a seat back 14. A recliner assembly 16 interconnects the seat back 14 and the seat cushion 12. The recliner assembly 16 allows selective pivotal adjustment and locking of the seat back 14 between a plurality of reclined positions relative to the seat cushion 12.

Referring to FIGS. 2 through 5, the recliner assembly 16 includes a mobile plate 20 and a fixed plate 30. The mobile plate 20 is fixedly secured to the seat back 14. The fixed plate 30 defines a pivot axis for the seat back 14 and is fixedly secured to the seat cushion 12 by any suitable means known by those having ordinary skill in the art, such as welding or bolting. The mobile plate 20 is rotatably coupled to the fixed plate 30 for providing pivotal movement of the seat back 14 relative to the seat cushion 12.

Figure 4:
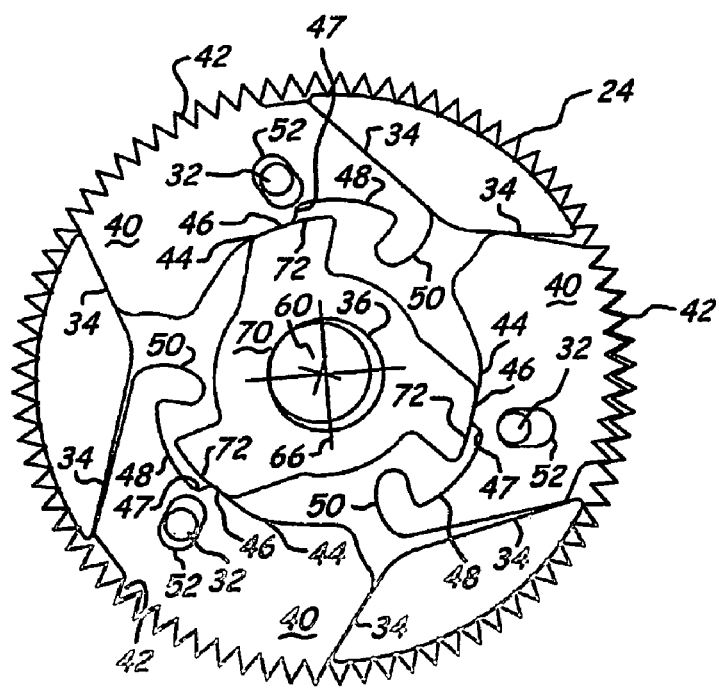
FIG. 4 is a side view of the recliner assembly in the locked condition.
Figure 2:
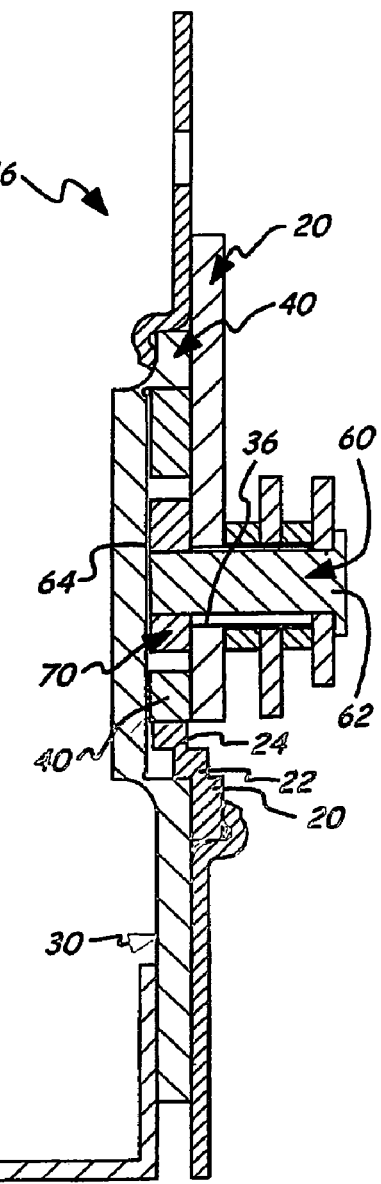
FIG. 2 is a cross sectional view of the recliner assembly.
Figure 3:
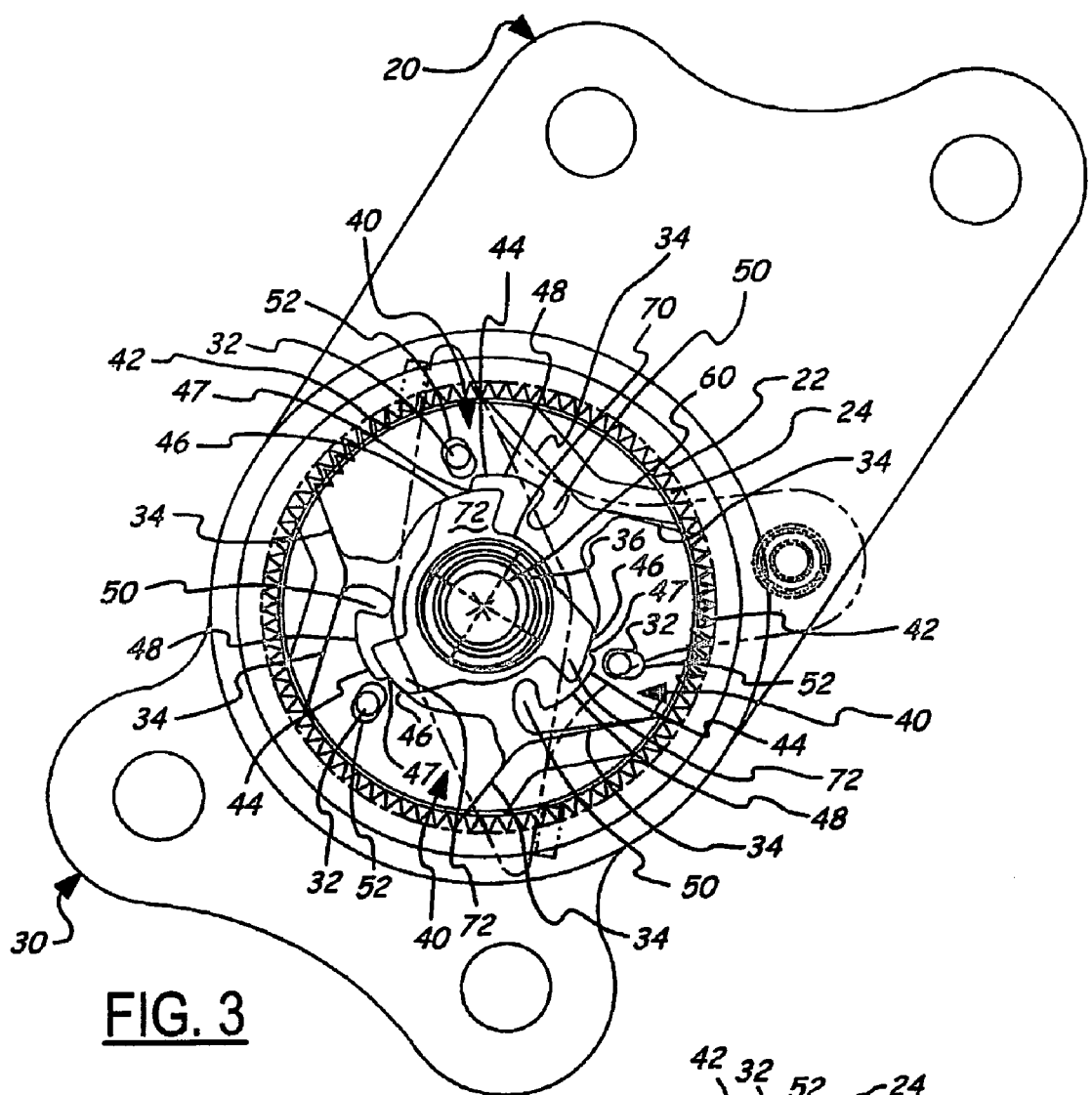
FIG. 3 is a side view of the recliner assembly in a locked condition.
Figure 5:
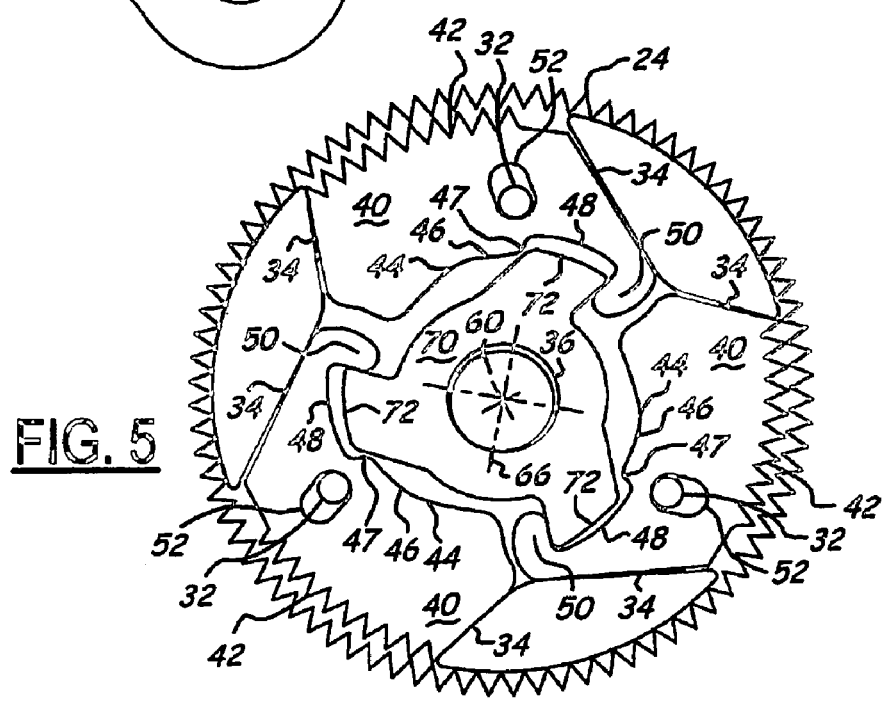
FIG. 5 is a side view of the recliner assembly in an unlocked condition.

The mobile plate 20 includes an annular rim 22 and a plurality of teeth 24 extending radially inwardly from the annular rim 22. The recliner assembly 16 also includes at least one pawl or sector 40 slidably supported by the fixed plate 30 for movement between a locked condition, as shown in FIGS. 3 and 4, and an unlocked condition, as shown in FIG. 5. Preferably, the recliner assembly 16 includes a plurality of sectors 40. In the locked condition, each sector 40 is lockingly engaged with the plurality of teeth 24 to maintain the seat back 14 in any one of the plurality of reclined positions. In the unlocked condition, each sector 40 is disengaged from the plurality of teeth 24 to allow adjustment of the seat back 14 relative to the seat cushion 12 between the plurality of reclined positions.

More specifically, each sector 40 includes a rack of teeth 42 for lockingly engaging the plurality of teeth 24 on the mobile plate 20 when each of the sectors 40 is in the locked condition. A stepped cam surface 44 is formed in each of the sectors 40 opposite the rack of teeth 42. Each stepped cam surface 44 defines a raised portion 46 and a recess 48.

Preferably, the sector 40 includes a ramped surface 47 to provide a transition between the raised portion 46 and the recess 48. A bent arm 50 extends outwardly from the sector 40 such that the recess 48 extends between the bent arm 50 and the ramped surface 47.

A pin 32 protrudes from the fixed plate 30 through a slot 52 formed in each sector 40 to guide the movement of each sector 40 between the locked and unlocked conditions. Each sector 40 extends generally circumferentially between wedge surfaces 34 formed in the fixed plate 30. The wedge surfaces 34 are not parallel to each other so as to prevent binding of the sector 40 against the wedge surfaces 34 during movement between the locked and unlocked conditions.

A shaft 60 extends axially between first 62 and second 64 ends and defines a shaft axis 66 therebetween. At least one of the first 62 or second 64 ends of the shaft 60 extends through an aperture 36 formed in at least one of the mobile 20 or fixed 30 plates for rotation of the shaft 60 about the shaft axis 66 in either a locking direction or an opposite unlocking direction. In the Figures, the aperture 36 is formed in the mobile plate 20 and receives the second end 64 of the shaft 60 therethrough. The aperture 36 is oversized relative to the shaft 60 to allow a predetermined amount of radial movement of the shaft 60 within the aperture 36. A suitable release handle 68 is fixedly secured to the first end 62 of the shaft 60 to facilitate manual rotation of the shaft 60 about the shaft axis 66. A biasing member (not shown) rotatably biases the shaft 60 toward the locking direction.

A cam 70 is fixedly secured to the second end 64 of the shaft 60. The cam 70 rotates with the shaft 60 about the shaft axis 66. The cam 70 includes arms 72 each extending outwardly for engaging the bent arm 50 of one of the sectors 40. During rotation of the shaft 60 in the unlocking direction, each of the arms 72 of the cam 70 engage each of the bent arms 50 of each of the sectors 40 to move the sectors 40 from the locked condition to the unlocked condition. When the shaft 60 is rotated in the locking direction, each of the arms 72 engages the raised portion 46 of each of the stepped cam surfaces 44 of each of the sectors 40 to maintain the sectors 40 in the locked condition. The cam 70 moves or floats radially with the input shaft 60 to prevent binding of the cam 70 or sectors 40 during movement between the locked and unlocked conditions.

In operation, the shaft 60 is biased to rotate in the locking direction. Each arm 72 of the cam 70 is engaged with the raised portion 46 of the stepped cam surface 44. While engaged with the raised portion 46, the arm 72 maintains the sector 40 in the locked condition. In the locked condition, the rack of teeth 42 of each sector 40 is lockingly engaged with the plurality of teeth 24 on the fixed plate 30 to maintain the seat back 14 in one of the plurality of reclined positions.

To adjust the seat back 14 to another one of the plurality of reclined positions, the sectors 40 must be moved to the unlocked condition. The shaft 60 is rotated in the unlocking direction by applying a force to sufficiently overcome the bias that is applied to the shaft 60. The cam 70 rotates with the shaft 60. Each of the arms 72 rotates about the shaft axis 66. Each of the arms 72 disengages the raised portion 46 and engages the bent arm 50 of the respective sector 40. Each of the arms 72 is then radially aligned with the respective recesses 48 in the stepped cam surfaces 44 allowing each of the sectors 40 to move between the locked and unlocked conditions. Continued rotation of the shaft 60 in the unlocking direction causes arms 72 to pull on the bent arms 50 to cause movement of the sectors 40 to the unlocked condition. The pin 32 on the fixed plate 30 extending through the slot 52 in the sector 40 helps guide the sector 40 as it moves between the locked and unlocked conditions. In the unlocked condition, the rack of teeth 42 on the sectors 40 is disengaged from the plurality of teeth 24 on the mobile plate 20 to allow adjustment of the seat back 14 relative to the seat cushion 12 to a desired one of the plurality of reclined positions. The shaft 60 must be held in the unlocking direction such that the rack of teeth 42 remains disengaged from the plurality of teeth 24.

After the seat back 14 is moved to the desired one of the plurality of reclined positions, the shaft 60 is allowed to rotate in the locking direction due to the force applied by the biasing member. The cam 70 rotates with the shaft 60. Each of the arms 72 rotates away from each of the bent arms 50 and toward the ramped surfaces 47. Each sector 40 moves toward the locked condition when each arm 72 engages the ramped surface 47 of the respective sector 40. Eventually, continued rotation of the shaft 60 in the locking direction causes the arm 72 to move past the ramped surface 47 and engage the raised portion 46 of the stepped cam surface 44. The rack of teeth 42 re-engages the plurality of teeth 24 to maintain the seat back 14 in the desired one of the reclined positions.

Figure 6:
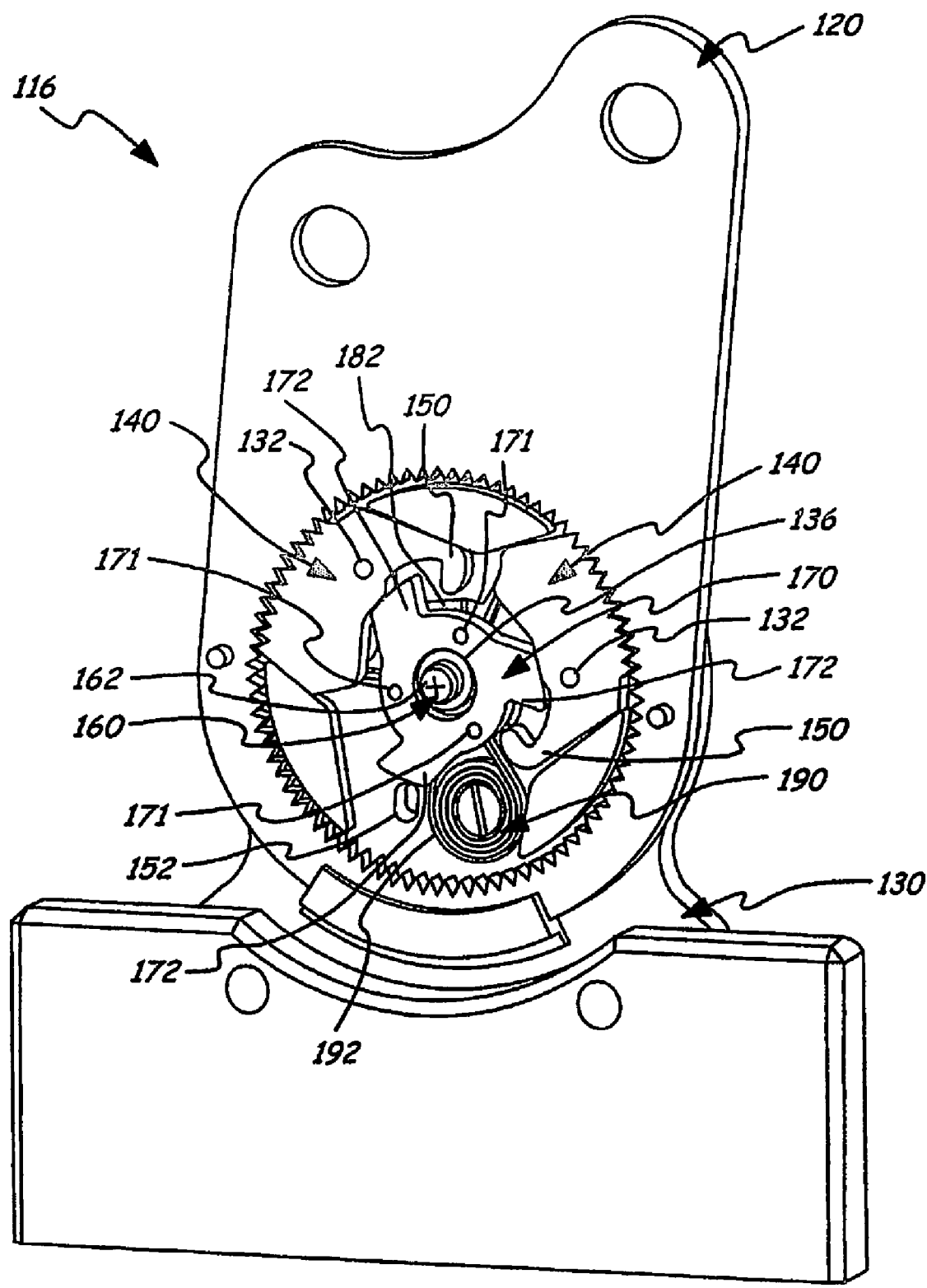
FIG. 6 is a cut-away perspective view of an alternative embodiment of the recliner assembly.
Figure 7:
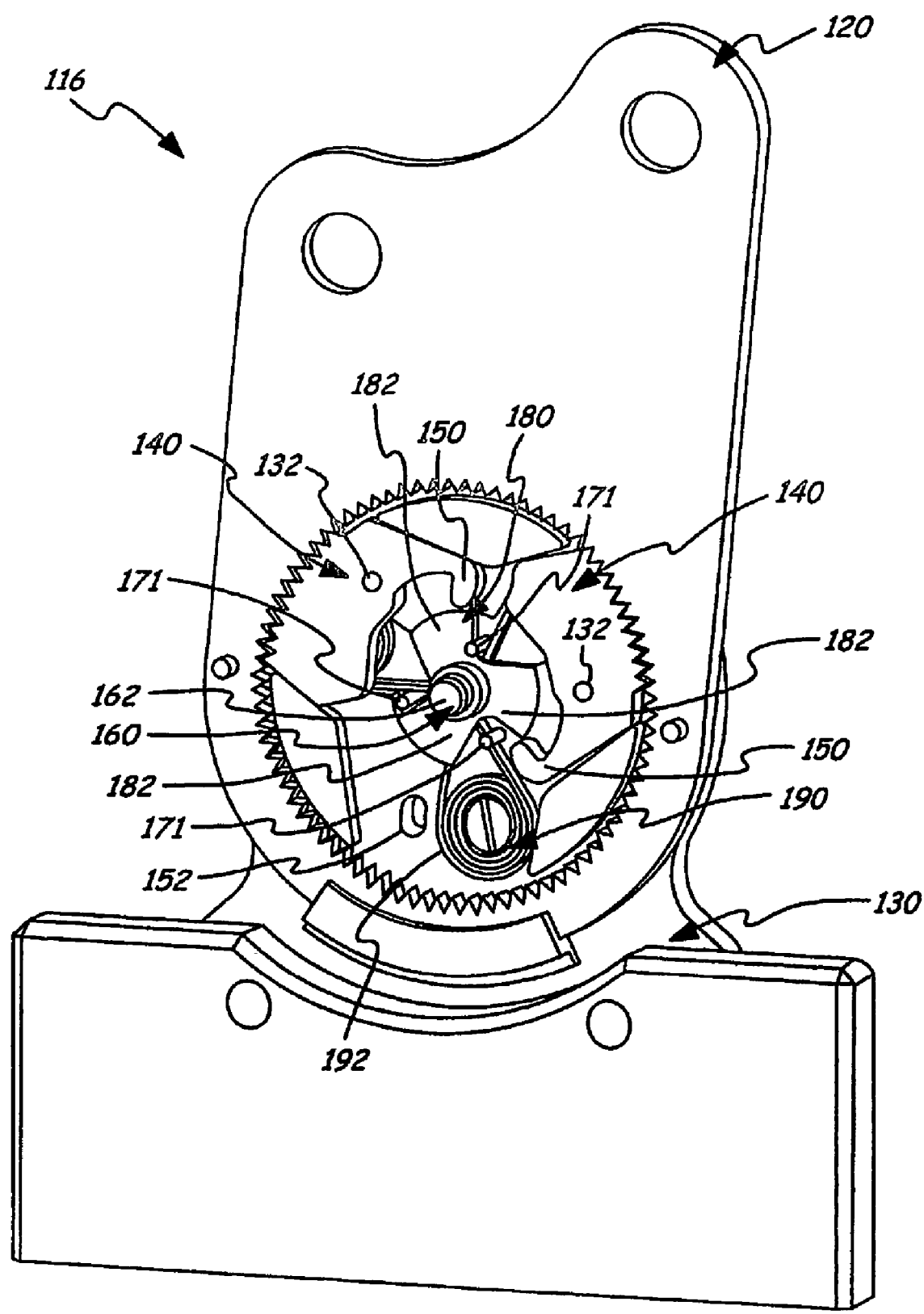
FIG. 7 is a cut-away perspective view of the alternative embodiment of the recliner assembly with the cam removed to simplify the view.

An alternative embodiment of the recliner assembly is generally indicated at 116 in FIGS. 6 and 7, wherein like elements of the alternative embodiment have reference characters offset by 100 from those in the first embodiment. The shaft 160 is rotatably journaled to the mobile 120 and fixed 130 plates for rotation about the shaft axis 166. The shaft 160 is not movable radially with respect to either the mobile 120 or fixed 130 plates. The shaft 160 includes a reduced-diameter portion 162. The reduced-diameter portion 162 extends axially through an aperture 136 formed in the cam 170. The aperture 136 is oversized relative to the reduced-diameter portion 162 of the shaft 160 to allow a predetermined amount of radial movement of the cam 170 relative to the shaft 160. Alternatively, the shaft 160 can have a constant diameter and the aperture 136 can be made larger to provide the same predetermined amount of radial movement of the cam 170 relative to the shaft 160.

The cam 170 includes at least one pin 171 extending axially therefrom. A cam driver 180 is fixedly secured to the shaft 160. The cam driver 180 rotates with the shaft 160 about the shaft axis 166. At least one arm 182 extends radially outwardly from the cam driver 180 to engage each pin 171. Each arm 182 engages each pin 171 during rotation of the shaft 160 in the unlocking direction to cause rotation of the cam 170 with the cam driver 180 in the unlocking direction. During rotation of the cam 170 in the unlocking direction, each of the arms 172 of the cam 170 engage the bent arm 150 of each of the sectors 140 to move the sectors 140 from the locked condition to the unlocked condition.

At least one biasing member 190 is supported in a corresponding recess 192 defined in the fixed plate 130. The biasing member 190 is continuously energized between the fixed plate 130 and one of the pins 171 of the cam 170 for continuously biasing the cam 170 in the locking direction. The biasing member 190 can be any suitable biasing means, such as a coil or spiral spring.

A pin 132 protrudes axially from each of the plurality of sectors 140 through a corresponding slot 152 formed in the fixed plate 130 to guide the movement of each sector 140 between the locked and unlocked conditions.

In operation, the seat back 14 is adjusted to another one of the plurality of reclined positions by rotating the shaft 160 in the unlocking direction. A sufficient rotating force must be applied to the shaft in the unlocking direction to sufficiently overcome the bias applied to the cam 170 by the biasing members 190. The cam driver 180 rotates with the shaft 160. Each arm 182 of the cam driver 180 rotates about the shaft axis 166 and engages each of the pins 171 to cause rotation of the cam 170 with the cam driver 180 in the unlocking direction. Each of the arms 172 engages the bent arm 150 of the respective sector 140 to cause movement of the sectors 140 to the unlocked condition. The pin 132 on each of the sectors 140 extends through the slots 152 in the fixed plate 130 to help guide the sector 140 as it moves between the locked and unlocked conditions. In the unlocked condition, all of the sectors 140 are disengaged from the mobile plate to allow pivotal adjustment of the seat back 14 relative to the seat cushion.

After the seat back 14 is moved to the desired one of the plurality of reclined positions, the cam 170 is allowed to rotate in the locking direction due to the force directly applied by the biasing members 190. Each of the arms 172 rotates away from the bent arm 150. Each of the arms 172 eventually engages the ramped surface 147 and the raised portion 146 of each sector 140 to move each sector 140 to the locked condition. The cam 170 is continuously biased about the shaft axis 166 and also floats radially relative to the shaft 166 so that the cam 170 wedges itself between the raised portions 146 of the sectors 140 to maintain the sectors 140 in the locked condition.

Returning to the first embodiment, when a plurality of sectors 40 is used, it is preferable that the sectors 40 are offset or not equally spaced about the pivot axis defined by the fixed plate 30. The sectors 40 of a three-sector recliner would not, for example, be equally spaced at 120 degrees about the pivot axis. Rather, the three sectors 40 could be spaced at 123, 241.5 and 360 degrees with respect to a given orientation. Two locking conditions, as a result of this offset arrangement, are described below.

In one locking condition, the rack of teeth 42 of one of the sectors 40 is fully engaged with the plurality of teeth 24 on the mobile plate 20 and the rack of teeth 42 of the remaining sectors 40 are partially engaged. In a second locking condition, the rack of teeth 42 of all of the sectors 40 are partially engaged with the plurality of teeth 24 on the mobile plate 20. Because the sectors 40 are not tightly guided by the wedge surfaces 34, the sectors 40 that are not fully engaged can rotate and move non-radially in a self-adjusting movement under the continuous locking bias of the cam 70. The self-adjusting movement allows each of the rack of teeth 42 to engage as much of the plurality of teeth 24 as possible to have as strong of a locking engagement as possible. The cam 70 is continuously biased about the shaft axis 66 and also floats radially so that in either full or partial locking conditions the cam 70 wedges itself between the raised portion 46 of the sectors 40 to maintain the sectors 40 in full or partial locking engagement.

The angle defined between each of the plurality of reclined positions of the seat back 14 that corresponds to a fully engaged locking condition typically defines an increment of seat back adjustment in conventional recliner assemblies. The self-adjusting movement of the sectors 40 and the radially floating movement of the cam 70 allows, however, the seat back 14 to be locked in each of the plurality of reclined positions that corresponds to a partially engaged locking condition. Thus, the recliner assembly 16 having the plurality of sectors 40 arranged in an offset manner provides a finer increment of seat back adjustment over conventional recliner assemblies.

The rack of teeth 42 extends between two ends of the sector 40. Individual teeth at each end of the sector 40 are shorter radially relative to the teeth between the two ends of the rack of teeth 42. This enables partial locking engagement between the rack of teeth 42 and the plurality of teeth 24 on the mobile plate 20 to be maximized.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed:

1. A recliner assembly for use with a seat having a seat cushion and a seat back pivotal between a plurality of reclined positions with respect to the seat cushion, the recliner assembly comprising:

a fixed plate adapted to be secured to the seat cushion;

a mobile plate adapted to be secured to the seat back, the mobile plate coupled to the fixed plate for providing pivotal movement of the seat back through the plurality of reclined positions, the mobile plate including an annular rim defining an axis and a plurality of teeth extending along the annular rim;

a plurality of sectors each having a rack of teeth coupled between the fixed and mobile plates, each sector movable between a locked condition having the rack of teeth engaged with the plurality of teeth of the mobile plate for maintaining the seat back in any of the plurality of reclined positions and an unlocked condition having the rack of teeth disengaged from the plurality of teeth of the mobile plate for allowing selective adjustment of the seat back relative to the seat cushion;

a cam extending about the axis and selectively engagable with each sector and rotatably supported between the fixed and mobile plates for moving each sector between the locked and unlocked conditions in response to rotation of the cam, the cam radially movable relative to each sector for preventing binding of the sectors during movement between the locked and unlocked conditions; and wherein the rack of teeth of at least one sector extends between opposing radially ends of the sector and wherein individual teeth at the ends of the sector are shorter radially compared to adjacent teeth between the ends of the rack of teeth.

2. The recliner assembly of claim 1 wherein the fixed plate includes wedge surfaces formed thereon for engaging and guiding each sector between the locked and unlocked conditions.

3. The recliner assembly of claim 1 wherein the fixed plate includes at least one pin protruding therefrom and extending through a slot formed in the sector for guiding movement of the sector between the locked and unlocked conditions.

4. The recliner assembly of claim 1 wherein the plurality of sectors are unequally spaced about the axis.

5. The recliner assembly of claim 4 wherein the rack of teeth of one of the plurality of sectors is fully engaged with the plurality of teeth on the mobile plate and the rack of teeth of the other of the plurality of sectors are partially engaged with the plurality of teeth on the mobile plate in the locked condition.

6. The recliner assembly of claim 5 wherein the partially engaged sector is self-adjusting.

7. The recliner assembly of claim 4 wherein the rack of teeth of each of the plurality of sectors is partially engaged with the plurality of teeth on the mobile plate in the locked condition.

8. The recliner assembly of claim 7 wherein the plurality of partially engaged sectors are self-adjusting.

9. The recliner assembly of claim 1 wherein each sector includes a stepped cam surface formed opposite the rack of teeth.

10. The recliner assembly of claim 9 wherein the stepped cam surface defines a raised portion and a recess separated by a ramped surface.

11. The recliner assembly of claim 10 wherein each sector includes a bent arm extending outwardly from the sector wherein the recess extends between the bent arm and the ramped surface.

12. The recliner assembly of claim 11 wherein the cam includes arms extending outwardly for engaging the bent arm of the each sector.

13. The recliner assembly of claim 12 wherein arms engage the raised portion of the stepped cam surface for maintaining each sector in the locked condition.

14. The recliner assembly of claim 1 including a shaft having first and second ends defining a shaft axis.

15. The recliner assembly of claim 14 wherein the cam is secured to the second end of the shaft.

16. The recliner assembly of claim 14 wherein at least one of the first or second ends extends through an aperture formed in at least one of the mobile or fixed plates for rotation of the shaft about the shaft axis.

17. The recliner assembly of claim 16 wherein the aperture is oversized relative to the shaft to allow a predetermined amount of radial movement of the shaft within the aperture.

18. A recliner assembly for use with a seat having a seat cushion and a seat back pivotal between a plurality of reclined positions with respect to the seat cushion, the recliner assembly comprising:
a fixed plate adapted to be secured to the seat cushion;
a mobile plate adapted to be secured to the seat back, the mobile plate coupled to the fixed plate for pivotal movement of the seat back through the plurality of reclined positions, the mobile plate including an annular rim defining an axis and a plurality of teeth extending along the annular rim;
a plurality of sectors each having a rack of teeth coupled between the fixed and mobile plates, each sector movable between a locked condition having the rack of teeth engaged with the plurality of teeth of the mobile plate for maintaining the seat back in any of the plurality of reclined positions and an unlocked condition having the rack of teeth disengaged from the plurality of teeth of the mobile plate for allowing selective adjustment of the seat back relative to the seat cushion;
a shaft rotatably journaled to the mobile and fixed plates;
a cam extending about the axis and selectively engagable with each sector and rotatably supported by the shaft between the fixed and mobile plates for moving each sector between the locked and unlocked conditions in response to rotation of the cam, the cam radially movable relative to each sector for preventing binding of the sector during movement between the locked and unlocked conditions; and
wherein the shaft includes a reduced diameter portion extending axially through an aperture formed in the cam, the aperture being oversized relative to the reduced diameter portion allowing a predetermined amount of radial movement of the cam relative to the shaft.

19. The recliner assembly of claim 18 wherein the cam includes a plurality of pins extending axially therefrom.

20. The recliner assembly of claim 19 including a cam driver secured to the shaft.

21. The recliner assembly of claim 20 wherein the cam driver includes a plurality of arms extending radially outwardly for engaging the respective plurality of pins.

22. The recliner assembly of claim 21 wherein each arm engages each corresponding pin during rotation of the shaft in the unlocking direction for rotating the cam.

23. The recliner assembly of claim 18 wherein the cam includes arms for engaging bent arms of each sector.

24. The recliner assembly of claim 18 including a biasing member supported in a recess formed in the fixed plate for biasing the cam in the locking direction.

25. A recliner assembly for use with a seat having a seat cushion and a seat back pivotal between a plurality of reclined positions with respect to the seat cushion, the recliner assembly comprising:
a fixed plate adapted to be secured to the seat cushion;
a mobile plate adapted to be secured to the seat back, the mobile plate coupled to the fixed plate for pivotal movement of the seat back through the plurality of reclined positions, the mobile plate including an annular rim defining an axis and a plurality of teeth extending along the annular rim;
a plurality of sectors each having a rack of teeth coupled between the fixed and mobile plates, each sector movable between a locked condition having the rack of teeth engaged with the plurality of teeth of the mobile plate for maintaining the seat back in any of the plurality of reclined positions and an unlocked condition having the rack of teeth disengaged from the plurality of teeth of the mobile plate for allowing selective adjustment of the seat back relative to the seat cushion, wherein the fixed plate includes wedge surfaces formed thereon for engaging and guiding the sectors between the locked and unlocked conditions;
a cam extending about the axis and selectively engagable with each of the sectors and rotatably supported between the fixed and mobile plates for moving the sectors between the locked and unlocked conditions in response to rotation of the cam, the cam radially movable relative to the sectors for preventing binding of the sector during movement between the locked and unlocked conditions; and
wherein the plurality of sectors being unequally spaced about the axis.

* * * * *